United States Patent
Wang et al.

(10) Patent No.: US 12,030,976 B2
(45) Date of Patent: Jul. 9, 2024

(54) DEVOLATILIZATION PROCESSES

(71) Applicant: ExxonMobil Chemical Patents Inc., Baytown, TX (US)

(72) Inventors: Yu F. Wang, Houston, TX (US); Justin R. Huber, Seabrook, TX (US)

(73) Assignee: ExxonMobil Engineering & Technology Company, Baytown, TX (US)

( * ) Notice: Subject to any disclaimer, the term of this patent is extended or adjusted under 35 U.S.C. 154(b) by 572 days.

(21) Appl. No.: 17/326,916

(22) Filed: May 21, 2021

(65) Prior Publication Data

US 2021/0284764 A1    Sep. 16, 2021

Related U.S. Application Data

(62) Division of application No. 16/556,323, filed on Aug. 30, 2019, now Pat. No. 11,041,030.

(60) Provisional application No. 62/733,307, filed on Sep. 19, 2018.

(51) Int. Cl.

| | |
|---|---|
| *C08F 2/01* | (2006.01) |
| *C08F 2/00* | (2006.01) |
| *C08F 2/06* | (2006.01) |
| *C08F 6/10* | (2006.01) |
| *C08F 6/12* | (2006.01) |
| *C08F 10/00* | (2006.01) |

(52) U.S. Cl.
CPC ........... *C08F 6/10* (2013.01); *C08F 2/001* (2013.01); *C08F 2/01* (2013.01); *C08F 2/06* (2013.01); *C08F 10/00* (2013.01)

(58) Field of Classification Search
CPC .............. C08F 2/01; C08F 6/10; C08F 6/12
See application file for complete search history.

(56) References Cited

U.S. PATENT DOCUMENTS

| | | | |
|---|---|---|---|
| 3,884,857 A * | 5/1975 | Ballard | C08F 10/00 526/232.3 |
| 3,912,698 A | 10/1975 | Shurts | |
| 4,623,712 A | 11/1986 | Irani et al. | |
| 5,599,885 A | 2/1997 | Kawasaki et al. | |
| 6,881,880 B1 * | 4/2005 | Wilson | A01H 6/4684 435/468 |
| 7,163,989 B2 * | 1/2007 | Friedersdorf | B01J 19/002 526/170 |

(Continued)

FOREIGN PATENT DOCUMENTS

| | | |
|---|---|---|
| CA | 2372121 | 11/2000 |
| WO | 92/14766 | 9/1992 |

(Continued)

*Primary Examiner* — Rip A Lee

(57) ABSTRACT

In at least one embodiment, a process of forming a polymer includes supplying a feed having one or more olefin monomers and a solvent; contacting the feed with a catalyst to form a reaction mixture; treating the reaction mixture in a first separator to form a first polymer-rich mixture; introducing the first polymer-rich mixture into a second separator; introducing a volatile component and/or inert component into the first separator, the second separator and/or a line between the first separator and the second separator; treating the first polymer-rich mixture to form a second polymer-rich mixture; and devolatilizing the second polymer-rich mixture to obtain the polymer.

12 Claims, 3 Drawing Sheets

(56) References Cited

U.S. PATENT DOCUMENTS

| | | | |
|---|---|---|---|
| 7,994,237 B2 | 8/2011 | Kiss et al. | |
| 8,425,847 B2 * | 4/2013 | Devoy | B01D 3/10 422/138 |
| 8,796,408 B2 * | 8/2014 | Wang | C08F 10/00 422/138 |
| 9,138,713 B2 * | 9/2015 | Wang | C08F 10/00 |
| 2011/0172375 A1 | 7/2011 | Yeh et al. | |
| 2012/0088893 A1 | 4/2012 | Jog et al. | |

FOREIGN PATENT DOCUMENTS

| | | |
|---|---|---|
| WO | 94/00500 | 1/1994 |
| WO | 2011/087728 | 7/2011 |
| WO | 2011/087729 | 7/2011 |
| WO | 2011/087730 | 7/2011 |
| WO | 2011/087731 | 7/2011 |
| WO | 2013/154690 | 10/2013 |
| WO | 2014/035664 | 3/2014 |
| WO | 2017/108963 | 6/2017 |

* cited by examiner

DEVOLATILIZATION PROCESSES

CROSS-REFERENCE TO RELATED APPLICATIONS

This application is a divisional of U.S. Non-Provisional applicant Ser. No. 16/556,323, filed on Aug. 30, 2019, issued as U.S. Pat. No. 11,041,030, on Jun. 22, 2021, which claims priority to U.S. Provisional Application No. 62/733,307, filed on Sep. 19, 2018, herein incorporated by reference.

FIELD

The present disclosure provides plants and processes for polymerization to form polymers, in particular to plants and processes for continuous solution polymerization with improved residual monomer and pelletization performance.

BACKGROUND

Continuous solution polymerization processes generally involve the addition of catalyst to a monomer and solvent mixture. The mixture may be back-mixed giving a uniform polymer in an environment with substantially no concentration gradients. WO 94/00500 (Pannell et al.) describes a solution polymerization using metallocene in a continuous stirred tank reactor, which may be in a series reactor arrangement to make a variety of products.

The heat of the polymerization reaction, called an exotherm, can be absorbed by the reaction mixture. Alternatively, or in addition, the heat of reaction can be removed by a cooling system, such as by external cooling of the walls of the reactor vessel, or by internally arranged heat exchange surfaces cooled by a heat exchange fluid.

In the course of the polymerization, a predominant amount of the monomers is consumed and the polymers formed are dissolved in the solvent. Usually, the higher the concentration of the polymer, the higher the viscosity of the polymerization reaction mixture containing the polymer, solvent, and unreacted components. The mixture passes from the polymerization reactor to a finishing section in which polymer, solvent and unreacted monomer are separated (e.g., by devolatilization). In the finishing process, solvent and unreacted monomers are progressively removed from the reaction mixture until the polymer can be formed into a solid pellet or bale. The separated solvent and monomer can be recycled to the polymerization reactor.

In particular, devolatilizing of polymer for polymer quality improvement is a procedure in the industrial production of adhesives, elastomers, surface coatings and plastic materials (such as thermosetting and thermoplastic resins). In this process, volatile components such as monomers, oligomers, additives and solvents involved in polymerization, as well as by-products, can be devolatilized from the polymer. Additives can be, for example, suspending agents. The process of devolatilization allows the optical and mechanical properties of the polymer to be improved.

Devolatilization can be important in the marketing manufacture of various polymers. For example, where a polymer is produced from a solution of monomers, it may be desirable to remove the solution and unreacted monomers from the final product. One method for isolating polymers from volatile components is by evaporation where the polymer solution is heated above the vaporization temperature of the volatile components. The apparatus and method utilized is often dependent on the viscosity of the polymer solution and often, and these devices have a high initial cost and are costly to operate. To obtain a high output, very large devices and great expenditures of mechanical energy are typically involved. In addition, these devices impart mechanical shear to the polymer and in some cases may cause deterioration of physical properties.

In addition, methods and devices which heat the polymer solution within a zone of heat exchange involve subjecting polymer solutions to high temperatures for prolonged periods of time. Such exposure may cause thermal degradation of heat sensitive thermoplastics such as styrene polymers, including copolymers and mixtures thereof. This thermal degradation may result in discoloration and/or loss of engineering properties, such as impact strength. Processes and apparatuses which attempt to avoid the degradation of heat sensitive polymers can have low output. Polymers are generally subjected to mild temperatures and a long residence time within the zone of heat exchange. Where this occurs, either output suffers due to a low flow rate through the zone of heat exchange or a very large (and expensive) zone of heat exchange is used to provide the devolatilization. As mentioned above, long residence time and high heat inputs within the zone of heat exchange can result in damage to the product in the form of polymer degradation or copolymerization.

The finishing section may also include a devolatilizer (e.g., an extruder and pelletizer), in particular a vacuum devolatilizer in which the molten polymer is exposed to a vacuum while being intensively agitated to draw off volatiles such as solvent and residual monomer in order to reduce the level of volatile component(s) in the final polymer to a desired level. The conditions for use of an extruder and pelletizer have a narrow range of application, especially for softer copolymers. Furthermore, polymers such as low density polyethylene homopolymers and copolymers, particularly those incorporating polar comonomers (e.g., vinyl acetate), become more difficult to pelletize as the melt index of the polymer increases. Conventionally, pelletizing such polymers has involved methods such as reduced production rates, suitable extruder and pelletizer conditions, and/or cooling the polymer by various methods involving heat transfer to a cooling fluid or vapor. There are two aspects for stable pelletization: 1) the target temperature should stay within a narrow window, such as plus or minus 2° C.; and 2) deviation from the target temperatures should be corrected in a timely manner in order to avoid pelletization impairments. Therefore, there is a need for improved continuous solution processes and plants which provide one or more of: producing polymers containing a trace amount of volatile component(s) with minimal requirement for additional equipment and minimal operating costs across a broad range of operating windows including varying polymerization temperatures; producing a broad spectrum of polymers, particularly polymers of widely varying average molecular weights, molecular weight distributions, and/or comonomer contents; and increasing pelletization rate of polymers in the finishing section.

SUMMARY

The present disclosure provides plants and processes for polymerization to form polymers, in particular to plants and processes for continuous solution polymerization with improved residual monomer and pelletization performance. In at least one embodiment, a process of forming a polymer includes supplying a feed having one or more olefin monomers and a solvent; contacting the feed with a catalyst to form a reaction mixture; treating the reaction mixture in a first separator to form a first polymer-rich mixture; introducing the first polymer-rich mixture into a second separator; introducing a volatile component or inert component (e.g., an "inert") into the first separator, the second separator, and/or a line between the first separator and the second separator; treating the first polymer-rich mixture to form a second polymer-rich mixture; and devolatilizing the second polymer-rich mixture to obtain the polymer. In another embodiment, a plant for forming a polymer includes a polymerization reactor; a first separator downstream of the reactor; a second separator downstream of the first separator; a volatile component source coupled with the first separator, the second separator, and/or a line between the first separator and the second separator; and a devolatilizer downstream of the second separator.

DETAILED DESCRIPTION

Figure 1:
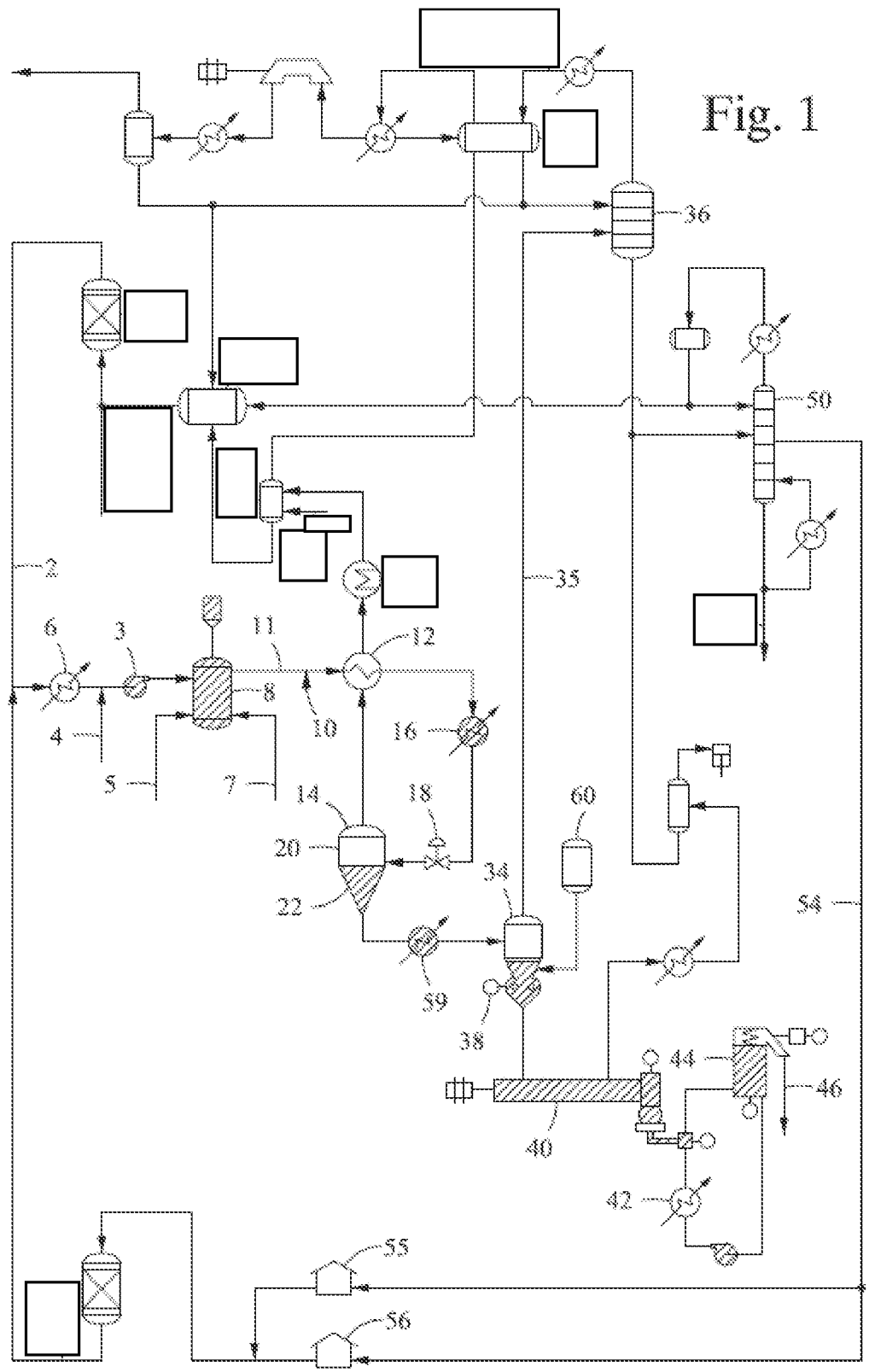
FIG. 1 shows a schematic layout of plant and process flow in one embodiment of the present disclosure in which a temperature adjustment unit is arranged downstream of the first separator and upstream of the second separator.

The present disclosure provides plants and processes for polymerization to form polymers, in particular to plants and processes for continuous solution polymerization with improved residual monomer and pelletization performance. In at least one embodiment, a process of forming a polymer includes supplying a feed having one or more olefin monomers and a solvent; contacting the feed with a catalyst to form a reaction mixture; treating the reaction mixture in a first separator to form a first polymer-rich mixture; introducing the first polymer-rich mixture into a second separator; introducing a volatile component into the first separator and/or the second separator; treating the first polymer-rich mixture to form a second polymer-rich mixture; and devolatilizing the second polymer-rich mixture to obtain the polymer. In another embodiment, a plant for forming a polymer includes a polymerization reactor; a first separator downstream of the reactor; a second separator downstream of the first separator; a volatile component source coupled with the first separator or the second separator; and a devolatilizer downstream of the second separator.

The present disclosure provides a process for devolatilization by injecting volatile organic component(s) (VOC) or inerts into concentrated polymer solutions (sometimes referred to as "cement"), thus forming a mixture that remains as a liquid phase prior to flashing. A present injection process can enable control of the injection pressure and precise polymer melt temperature control in a timely manner, which can enhance the cost-efficiency and production of high grade polymers. A process can include controlling the amount of VOC in a low pressure separator (LPS) (e.g., a flash tank), which can rapidly provide an amount of cooling by evaporative cooling by removal of the components in the LPS and control of the polymer melt temperature (e.g., for downstream extrusion processes) through selection of VOC/inert species and quantities. A present devolatilization process of volatile organic components can provide a reduction in the amount of volatile components in a polymer product. For example, the injected component (such as isohexane ($iC_6$) or ethylene) can reduce the partial pressure of a solvent in a concentrated polymer solution formed during the polymerization process, thus providing a significant increase of devolatilization, and enabling the removal of both solvent(s) and resulting low product volatiles. A devolatilization process of VOCs may increase resulting polymer purity and pelletization performance, thereby promoting enhanced processability, among other benefits.

Particularly, the present disclosure provides a process for forming a polymer including: (a) supplying a feed having one or more olefin monomer(s) and a solvent; (b) contacting the feed with a catalyst to form a reaction mixture; (c) treating the reaction mixture in a first separator to form a first polymer-rich mixture; (d) introducing the first polymer-rich mixture into a second separator; (e) introducing a volatile component or inert component into the first separator, the second separator, or a line between the first separator and the second separator; (f) treating the first polymer-rich mixture to form a second polymer-rich mixture; (g) devolatilizing the second polymer-rich mixture to obtain the polymer. Adjusting the temperature and the pressure of the second polymer-rich mixture can be accomplished by injecting a volatile component or inert component from the volatile component source to the second separator. Adjusting the temperature and the pressure of the second polymer-rich mixture can also be accomplished using a temperature adjustment unit coupled with a line between the first separator and the second separator in order to heat the first polymer-rich mixture in the line.

In at least one embodiment, a volatile component introduced to a second separator is a VOC with a boiling point temperature of about −105° C. (−157° F.) to about 80° C. (176° F.), such as of about −75° C. (−103° F.) to about 75° C. (167° F.), such as of about −65° C. (−85° F.) to about 65° C. (149° F.), such as of about −60° C. (−76° F.) to about 60° C. (140° F.), such as from about 40° C. (104° F.) to about 80° C. (176° F.), such as from about 50° C. (122° F.) to about 75° C. (167° F.), such as from about 60° C. (140° F.) to about 75° C. (167° F.). In at least one embodiment, "introducing" includes introducing the volatile component into the lower portion of the HPS and/or LPS. A lower portion (e.g., a bottom portion") can be the lower ½ portion of a separator of the present disclosure, such as the lower ⅓ portion of a separator, such as the lower ¼ portion of a separator, such as the lower ⅕ portion of a separator.

Suitable VOCs can be, but are not limited to, ethylene, propylene, butylene, isobutylene, butadiene, pentane, isopentane, hexane, $iC_6$, propane, butane, ethane and mixtures thereof. In at least one embodiment, a VOC is $iC_6$. Inerts can be nitrogen, carbon dioxide, etc.

In another aspect, the present disclosure provides a plant for forming a polymer, the plant including: a reactor for polymerizing monomers to form a reaction mixture; a first separator downstream of the reactor for treating the reaction mixture to form a first polymer-rich mixture; a second separator downstream of the first separator for treating the first polymer-rich mixture to form a second polymer-rich mixture; a devolatilizer downstream of the second separator for removing all volatile component(s) from the second polymer-rich mixture to obtain the polymer; and a volatile component source containing a VOC with a boiling point temperature of about −105° C. (−157° F.) to about 80° C. (176° F.) (such as of about −75° C. (−103° F.) to about 75° C. (167° F.), such as about −65° C. (−85° F.) to about 65° C. (149° F.), such as of about −60° C. (−76° F.) to about 60° C. (140° F.), such as from about 40° C. (104° F.) to about 80° C. (176° F.), such as from about 50° C. (122° F.) to about 75° C. (167° F.), such as from about 60° C. (140° F.) to about 75° C. (167° F.).

In at least one embodiment, the present disclosure provides a plant for forming a polymer including a volatile component source coupled to the second separator. For example, the volatile component source can be coupled to a lower portion of the second separator. Temperature of the second polymer-rich mixture at the second separator can be adjusted to a temperature of 160° C. to 40° C., such as 120° C. to 70° C., thus favoring the cooling of the polymer melt temperature in a timely manner. Lowering the temperature of the second polymer-rich mixture at the second separator may provide a significant increase of devolatilization driving force, thus favoring solvent(s) removal from a concentrated polymer solution, and further resulting in low product volatiles, which can promote pelletization impairments.

The polymers produced by processes of the present disclosure can be used in a wide variety of products and end-use applications. The polymers produced can be homo- and co-polymers of ethylene and propylene and include linear low density polyethylene, elastomers, plastomers, high-density polyethylenes, medium density polyethylenes, low density polyethylenes, polypropylene and polypropylene copolymers. Polymers, such as ethylene based copolymers, have a density of from 0.86 g/cm; to 0.97 g/cm$^3$; density being measured in accordance with ASTM D1238. Propylene based polymers produced include isotactic polypropylene, atactic polypropylene and random, or impact copolymers. In at least one embodiment, propylene based polymers produced include a branched propylene based polymer, such as polypropylene-based elastomers. Examples of polymer-based elastomers produced using a process of the present disclosure can be, but are not limited to, low viscosity polymers (LVP) and/or high viscosity polymers (HVP). In at least one embodiment, LVP is low viscosity Vistamaxx™ (LVV) available from ExxonMobil Chemical.

Not being bound by theory, it has been found that the temperature of the polymer-rich mixture can affect the efficiency of solvent removal downstream in the devolatilizer and pelletization rate during pelletization stage. If the desired polymer has a relatively high viscosity, it has been found that the volatile components contained in the polymer-rich mixture reduce by 100 ppm by weight for one Fahrenheit degree (° F.) increase of the temperature of the polymer-rich mixture fed to devolatilizer. In addition, if the desired polymer has a relatively low viscosity, it has been found that, during a pelletization stage of the devolatilized polymer, the lower the temperature of the devolatilized polymer, the higher the pelletization rate of the polymer due to the increased melt strength through crystallization. Thus, one can debottleneck the production process by heating and/or cooling of the polymer-rich mixture depending on the stage of the production. Hence, suitable low viscosity polypropylene-based elastomers for use in the present disclosure include Vistamaxx™ grades available from ExxonMobil Chemical, including low viscosity Vistamaxx™ (LVV).

In at least one embodiment, the propylene-based elastomer is a random copolymer having crystalline regions interrupted by non-crystalline regions and within the range from 3 to 25 wt %, by weight of the propylene-based elastomer, of ethylene or $C_4$ to $C_{10}$ α-olefin derived units, and optionally diene-derived units, the remainder of the polymer being propylene-derived units. Not being bound by theory, the non-crystalline regions may result from regions of non-crystallizable polypropylene segments and/or the inclusion of comonomer units. The crystallinity and the melting point of the propylene-based elastomer are reduced compared to highly isotactic polypropylene by the introduction of errors (stereo and region defects) in the insertion of propylene and/or by the presence of comonomer. The copolymer contains at least 55 wt % propylene-derived units by weight of the propylene-based elastomer. In at least one embodiment, the propylene-based elastomer is a propylene-based elastomer having limited crystallinity due to adjacent isotactic propylene units and a melting point as described herein. In at least one embodiment, the propylene-based elastomer is generally devoid of substantial intermolecular heterogeneity in tacticity and comonomer composition, and also devoid of substantial heterogeneity in intramolecular composition distribution.

The propylene-based elastomer contains greater than 50 wt %, such as greater than 60 wt %, such as greater than 65 wt %, such as greater than 75 wt % and up to 99 wt %/o propylene-derived units, based on the total weight of the propylene-based elastomer. In at least one embodiment, the propylene-based elastomer includes propylene-derived units in an amount based on the weight of propylene-based elastomer of from 75 wt % to 95 wt %, such as 75 wt % to 93 wt %, such as 83 wt % to 93 wt %, such as 83 wt % to 90 wt %. Correspondingly, the units, or comonomers, derived from at least one of ethylene or a $C_4$ to $C_{10}$ α-olefin may be present in an amount of 3 wt %, or 10 wt %, or 15 wt % to 22 wt %, or 25 wt % by weight of the elastomer.

The comonomer content may be adjusted so that the propylene-based elastomer having a heat of fusion of 100 J/g or less, or 75 J/g or less, a melting point ($T_m$) of 100° C. or 90° C. or less, and crystallinity of 2% to 65% of isotactic polypropylene, such as a melt flow rate ("MFR"), as measured at 230° C. and 2.16 kg weight, of less than 800 g/10 min.

The propylene-based elastomer may include more than one comonomer. In at least one embodiment, a propylene-based elastomer have more than one comonomer including propylene-ethylene-octene, propylene-ethylene-hexene, and propylene-ethylene-butene copolymers.

In at least one embodiment where more than one comonomers derived from at least one of ethylene or a $C_4$ to $C_{10}$ α-olefins are present, the amount of each comonomer is less than 5 wt % of the propylene-based elastomer, but the combined amount of comonomers by weight of the propylene-based elastomer is 5 wt % or greater.

Examples of comonomer can be ethylene, 1-hexene, or 1-octene, and in at least one embodiment, amount of comonomer is 5 wt %, or 10 wt %, or 15 wt % to 22 wt %, or 25 wt % based on the weight of the propylene-based elastomer.

In at least one embodiment, the propylene-based elastomer includes ethylene-derived units. The propylene-based elastomer may include 5 wt %, or 10 wt %, or 15 wt % to 22 wt %, or 25 wt % of ethylene-derived units by weight of the propylene-based elastomer. In at least one embodiment, the propylene-based elastomer consists of units derived from propylene and ethylene, i.e., the propylene-based elastomer does not contain another comonomer in an amount otherwise present as impurities in the ethylene and/or propylene feedstreams used during polymerization or an amount that would materially affect the heat of fusion, melting point, crystallinity, or melt flow rate of the propylene-based elastomer, or any other comonomer intentionally added to the polymerization process.

In at least one embodiment, diene comonomer units are included in the propylene-based elastomer. Examples of the diene can include 5-ethylidene-2-norbornene, 5-vinyl-2-norbornene, divinylbenzene, 1,4-hexadiene, 5-methylene-2-norbornene, 1,6-octadiene, 5-methyl-1, 4-hexadiene, 3,7-dimethyl-1,6-octadiene, 1,3-cyclopentadiene, 1,4-cyclohexadiene, dicyclopentadiene, or a combination thereof. The amount of diene comonomer is equal to or more than 0 wt %, or 0.5 wt %, or 1 wt %, or 1.5 wt % and lower than, or equal to, 5 wt %, or 4 wt %, or 3 wt % or 2 wt % based on the weight of propylene-based elastomer.

The propylene-based elastomer may have a percent crystallinity of 2% to 65%, such as 0.5% to 40%, such as 1% to 30%, such as 5% to 35%, of isotactic polypropylene. In at least one embodiment, the copolymer has a crystallinity in the range of 0.25% to 25%, or 0.5% to 22% of isotactic polypropylene.

In at least one embodiment, the propylene-derived units of the propylene-based elastomer have an isotactic triad fraction of 50% to 99%, such as 65% to 97%, such as 75% to 97%. In another embodiment, the first polymer has a triad tacticity as measured by $^{13}$C NMR, of 75% or greater, 80% or greater, 82% or greater, 85% or greater, or 90% or greater. The triad tacticity of a polymer is the relative tacticity of a sequence of three adjacent propylene units, a chain consisting of head to tail bonds, expressed as a binary combination of m and r sequences. It is usually expressed as the ratio of the number of units of the specified tacticity to all of the propylene triads in the first polymer. The triad tacticity (mm fraction) of a propylene copolymer can be determined from a $^{13}$C NMR spectrum of the propylene copolymer. The calculation of the triad tacticity is described in the U.S. Pat. No. 5,504,172, the entire contents of which are incorporated herein by reference.

The peak "melting point" ("$T_m$") is defined as the temperature of the greatest heat absorption within the range of melting of the sample. Propylene-based elastomer of the present disclosure may have a $T_m$ of 100° C. or less, 90° C. or less, 80° C. or less, or 70° C. or less. In at least one embodiment, the propylene-based elastomer has a $T_m$ of 25° C. to 100° C., such as 25° C. to 85° C., such as 25° C. to 75° C., or 25° C. to 65° C. In at least one embodiment, the propylene-based elastomer has a $T_m$ of 30° C. to 80° C., such as 30° C. to 70° C.

The propylene-based elastomer may have a density of 0.85 g/cm$^3$ to 0.95 g/cm$^3$, such as 0.86 g/cm$^3$ to 0.92 g/cm$^3$, such as 0.86 g/cm$^3$ to 0.9 g/cm$^3$, at room temperature as measured per ASTM D1505.

In at least one embodiment, a first polymer has a melt flow rate ("MFR") of about 0.5 g/10 min to about 1,000 g/10 min, or less than or equal to 800 g/10 min, such as less than or equal to 500 g/10 min, such as less than or equal to 200 g/10 min, such as less than or equal to 100 g/10 min, such as less than or equal to 50 g/10 min. Embodiments may include a propylene-based elastomer with an MFR of less than or equal to 25 g/10 min g/10 min, such as from 1 g/10 min to 25 g/10 min, such as from 1 g/10 min to 20 g/10 min. The MFR is determined according to ASTM D1238, condition L (2.16 kg, 230° C.).

The propylene-based elastomer may have a weight average molecular weight ("Mw") of 5,000 g/mol to 5,000,000 g/mol, such as 10,000 g/mol to 1,000,000 g/mol, such as 50,000 g/mol to 400,000 g/mol; a number average molecular weight ("Mn") of 2,500 g/mol to 2,500.00 g/mol, such as 10,000 g/mol to 250,000 g/mol, such as 25,000 g/mol to 200,000 g/mol; and/or a z-average molecular weight ("Mz") of 10,000 g/mol to 7,000,000 g/mol, such as 80,000 to 700,000 g/mol, such as 100,000 g/mol to 500,000 g/mol. The propylene-based elastomer may have a molecular weight distribution (Mw/Mn, or "MWD") of 1.5 to 20, or 1.5 to 15, such as 1.5 to 5, such as 2 to 5, such as 2 to 4.

The propylene-based elastomer may have an Elongation at Break of less than 2000%, less than 1000%, or less than 800%, as measured per ASTM D412.

In at least one embodiment, the present disclosure provides a process for forming a polymer including: supplying a feed having one or more olefin monomer(s) and a solvent; contacting the feed with a catalyst to form a reaction mixture; treating the reaction mixture in a first separator to form a first polymer-rich mixture; treating the first polymer-rich mixture in a second separator to form a second polymer-rich mixture; and introducing a volatile component to the second separator. In at least one embodiment, a volatile component introduced in a second separator is a volatile organic component with a boiling point temperature of about −105° C. to about 80° C. (e.g., iC$_6$). In at least one embodiment, "introducing" includes introducing the volatile component into a lower portion of the LPS or HPS, e.g., introduced into a lower portion of the LPS below the fluid line of the first polymer-rich mixture which can promote mixing of the VOC with the first-polymer-rich mixture. The volatile component source can contain a VOC (e.g., iC$_6$) which can promote cooling of the polymer melt temperature in a timely manner and provide a significant increase of devolatilization driving force in order to remove the solvent from the concentrated polymer solution, and further resulting in low product volatiles usually responsible of pelletization impairments.

In at least one embodiment, suitable volatile organic components used for the process of devolatilization are low boiling point diluents/solvents for devolatilization which include non-coordinating, inert liquids. Examples include straight and branched-chain hydrocarbons, such as isobutane, butane, pentane, isopentane, isohexane, and mixtures thereof. Without being bound by theory, mixing of the VOC with the first-polymer-rich mixture promotes extraction of volatile components (such as reactor solvent and ethylene) in the first polymer-rich mixture by the VOC. The VOC and extracted volatile components can be volatilized within the LPS, and subsequently removed via an upper portion of the LPS. The VOC and extracted volatiles removed from the upper portion of the LPS can be separated, and then the VOC can be recycled, which provides an advantage over devolatilizing in only a devolatilizer because a separation tower (e.g., separation tower 50 of FIG. 1 is merely optional).

The present disclosure in another aspect provides a plant for forming a polymer, the plant including: a reactor for polymerizing monomers to form a reaction mixture; a first separator downstream of the reactor for treating the reaction mixture to form a first polymer-rich mixture; a temperature adjustment unit (e.g., heat exchanger 59 of FIG. 1) downstream of the first separator for increasing or decreasing the temperature of the first polymer-rich mixture; a second separator downstream of the first separator for treating the first polymer-rich mixture to form a second polymer-rich mixture; a volatile component source (configured to contain VOC) coupled to the second separator, such as a volatile component source coupled with (e.g., connected to) the lower section of the second separator; and a devolatilizer downstream of the second separator for removing volatile component(s) from the second polymer-rich mixture to obtain the polymer.

In another embodiment, the present disclosure provides a plant for forming a polymer, the plant including a reactor for polymerizing monomers to form a reaction mixture; a first separator downstream of the reactor suitable for treating the reaction mixture to form a first polymer-rich mixture; a second separator downstream of the first separator suitable for treating the first polymer-rich mixture to form second polymer-rich mixture wherein the polymer is more concentrated than in the first polymer-rich mixture; a volatile component source (configured to contain VOC) coupled with the second separator, such as a volatile component source coupled with (e.g., connected to) the lower section of the second separator; a temperature adjustment unit downstream of the second separator suitable for increasing in one embodiment or decreasing in another embodiment, the temperature of the second polymer-rich mixture; and a devolatilizer downstream of the temperature adjustment unit suitable for removing volatile component(s) from the second polymer-rich mixture to obtain the polymer.

In at least one embodiment, the present disclosure provides a plant for forming a polymer, the plant including a reactor for polymerizing monomers to form a reaction mixture; a first separator downstream of the reactor suitable for treating the reaction mixture to form a first polymer-rich mixture; a temperature adjustment unit downstream of the first separator for increasing or decreasing the temperature of the first polymer-rich mixture; a second separator downstream of the temperature adjustment unit suitable for treating the first polymer-rich mixture to form a second polymer-rich mixture wherein the polymer is more concentrated than in the first polymer-rich mixture; a volatile component source (configured to contain VOC) coupled with the second separator, such as a volatile component source coupled with (e.g., connected to) the lower section of the second separator; an additional temperature adjustment unit downstream of the second separator suitable for increasing or decreasing the temperature of the second polymer-rich mixture; and downstream of the additional temperature adjustment unit, a devolatilizer suitable for removing volatile component(s) from the second polymer-rich mixture to obtain the polymer.

In at least one embodiment, the reactor may be a single reactor or multiple reactors, for example two reactors arranged in parallel or in series. Each reactor may be a continuous stirred tank reactor. In at least one embodiment, two reactors are arranged in parallel or in series, and the internal volume of the first reactor to the internal volume of the second reactor may have a minimum ratio value of 50:50, 55:45, 60:40, 65:35, 70:30, 80:10, 85:15, or 90:10, and a maximum ratio value of 55:45, 60:40, 65:35, 70:30, 80:20, 85:15, 90:10, or 95:5, so long as the maximum ratio value is greater than the minimum ratio value. The reaction mixtures from the two reactors are combined and then passed to the first separator. In at least one embodiment, the reactor(s) may be a reactor suitable for continuous solution polymerization, for example, a continuously stirred flow tank.

The present disclosure will be described by illustration of a continuous solution polymerization, but the present disclosure is not limited to continuous solution polymerizations, and within the merit and spirit of the present disclosure, the plants and processes would be suitable for various types of polymerizations.

Monomers and catalysts may be supplied into the reactor(s) by any suitable units or apparatus. The plant may include a feed supplying unit for supplying a feed having one or more olefin monomers in a solvent, for example, a hydrocarbon solvent. The plant of the present disclosure may also include a catalyst supply unit suitable for supplying a catalyst to the reactor. The feed supply units suitable for supplying a feed of one or more olefin monomers in a solvent to the reactor may be any suitable apparatus, and may include a conduit for the supply of each of the monomers, a conduit for the supply of recycled solvent, and a conduit for the supply of fresh solvent. Each of these conduits may be fed to a common feed conduit prior to entry into the reactor. A pump or pumps may be used to pump the feed to the reactor or reactors and to pressurize the feed to the desired pressure. The catalyst supply units suitable for supplying a catalyst to the reactor may be any suitable apparatus, but may include a conduit for the supply of the catalyst, and optionally a pump or pumps to pump the catalyst to the reactor or reactors.

The first separator (e.g., "liquid phase separator" herein) may be an apparatus in which a liquid reaction mixture can be exposed to conditions under which it can separate into two liquid phases (such as a first polymer-rich mixture and a lean mixture).

The second separator (e.g., "flash tank" herein) may be an apparatus in which the liquid first polymer-rich mixture can be exposed to conditions under which it can be separated into a vapor phase and a second polymer-rich mixture in which the polymer is more concentrated than in the first polymer-rich mixture.

The volatile component source may be an apparatus used as an additional stream in which volatile organic component(s) (such as $iC_6$) can be stored and further introduced into the low pressure separator (LPS) containing the concentrated polymer solutions. The resulting mixture of VOC(s) and the concentrated polymer solutions remains liquid prior to flashing. The amount of VOC injected can be controlled in the LPS, which can provide an amount of cooling and control of polymer melt temperatures. In addition, a component will provide fast cooling through the evaporative cooling mechanism and reduce partial pressure of solvent in the concentrated polymer solutions. In at least one embodiment, the volatile component source has a temperature of about −30° C. (−22° F.) to about 100° C. (212° F.), such as of about −10° C. (14° F.) to about 100° C. (212° F.), such as of about 10° C. (50° F.) to about 80° C. (176° F.). In at least one embodiment, the volatile component source has a pressure of from about 1 Bar(g) to about 150 bar(g), such as from about 50 Bar(g) to about 150 Bar(g), such as from about 75 Bar(g) to about 125 Bar(g). In at least one embodiment, the flow rate of the volatile component is determined by the production rate and the amount of temperature desired.

In at least one embodiment, the LPS has a temperature of about −105° C. (−157° F.) to about 160° C. (320° F.), such as of about 40° C. (104° F.) to about 160° C. (320° F.), such as of about 80° C. (176°) F) to about 160° C. (320° F.), such as of about 100° C. (212° F.) to about 150° C. (302° F.). In at least one embodiment, the LPS has a pressure of from about atmospheric pressure to about 70 Bar(g), such as from about 1 Bar(g) to about 70 Bar(g), such as from about 30 Bar(g) to about 60 Bar(g). In at least one embodiment, the flow rate of the volatile component is determined by the production rate and the amount of temperature desired.

The temperature adjustment unit may be any device through which the first and/or the second polymer-rich mixture can be heated or cooled before being passed into the device downstream of the temperature adjustment unit. In at least one embodiment, the temperature adjustment unit is a heat exchanger. For example, the heat exchanger may include tubes with or without internal mixing element or parallel tubes with distributors, to avoid mal-distribution of the polymer-rich mixture. Heat exchange medium can be oil, steam, water, etc.

The devolatilizer may be any suitable device in which the second polymer-rich mixture can be exposed to a lower pressure, such as a vacuum, while being agitated, kneaded, extruded, or sprayed to expose new surface area, thereby causing further residual solvent and monomer to evaporate and be drawn off. Exemplary devolatilizers include, but are not limited to, a vacuum devolatilizer, a vented extruder, a flash pot, a falling strand evaporator, or a thin film evaporator. Suitable devolatilizers also include those described in U.S. Pat. Nos. 5,453,158, 4,940,472, 3,917,507, 3,799,234, 3,797,550, and 2,804,920; U.S. Patent Publication No. 2011/172383, and WO 2011/087730, the contents of which are incorporated herein by reference.

In at least one embodiment, the plants further include stabilizer addition units for adding stabilizer to the second polymer-rich mixture at a location downstream of the second separator and upstream of the vacuum devolatilizer. Further details relating to the addition of stabilizer are described in WO 2011/087731.

By raising the pressure by, for instance, a pump to above 2 MPa, above 5 MPa, above 7.5 MPa, above 12 MPa, or above 15 MPa, the formation of two-phase conditions can be avoided in the reactor arrangement and heating arrangement under a wide range of temperature and polymerization conditions. Hence, a wide variety of catalysts can be used in the process. Such a wide range of catalysts can be used to make high and/or low average molecular weight materials under suitable production conditions. Use of a separate pump to boost the pressure of the viscous reaction mixture between the reactor and the first separator can be optional (such pumps are more costly than the low viscosity feed pumps). The pressure of the pump also cascades through the process and combines with the absence of vaporization for the initial solvent separating stage to reduce overall pumping needs during finishing. The pressure of the pump advances the viscous reaction mixture to pressure reducing means upstream of the first separator without allowing phase separation prior to the pressure reducing means. In at least one embodiment, the pressure of the pump additionally advances one or both separated phases to further downstream fractionating systems or purification devices.

In at least one embodiment, a catalyst poison is added downstream of the reactor or reactors and upstream of the first separator to suppress further polymerization of the heated reaction mixture during separation. The lean mixture is passed through a cooling apparatus, which may include a heat integrating exchanger and a final cooler, and optionally a drier back to the inlet side of the pump. The first polymer-rich mixture is subjected to additional solvent removal downstream to obtain a solid polymer.

The addition of the catalyst poison permits the temperature to be increased without risking further polymerization so as to facilitate direct recycle, after removal of any surplus poison, of separated solvent and monomer to the feed supply units on the inlet side of the pump. The term "direct" means that the lean mixture generally does not need to be fractionated.

In at least one embodiment, energy consumption per unit polymer produced is low, with simple solvent recovery and energy integration systems, providing discharge reduction to atmosphere and recover heat from the effluent on the liquid phase separator.

Figure 3:
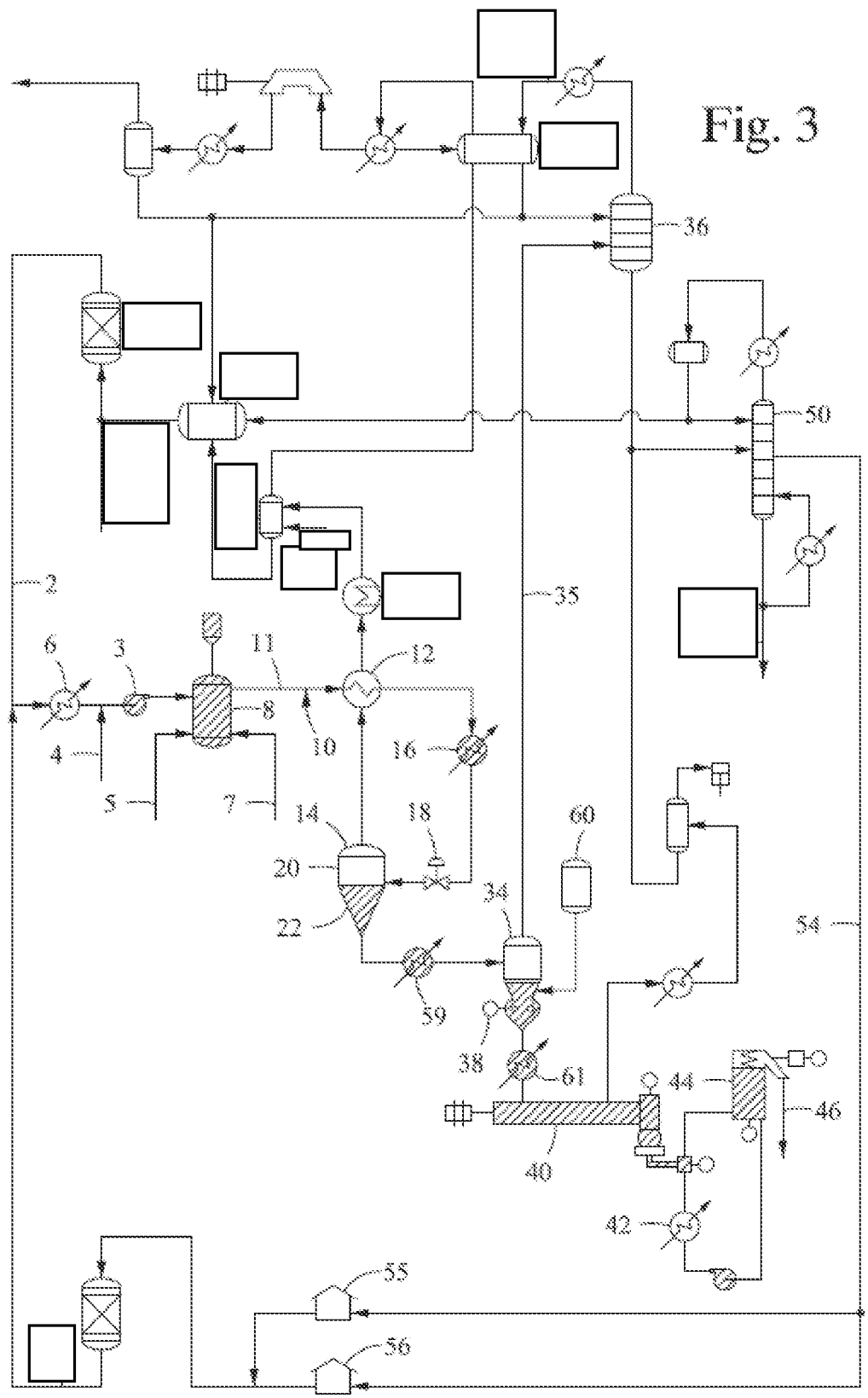
FIG. 3 shows a schematic layout of plant and process flow in still another embodiment of the present disclosure in which a temperature adjustment unit is arranged downstream of the first separator and upstream of the second separator and an additional temperature adjustment unit is arranged downstream of the second separator and upstream of the devolatilizer.

In at least one embodiment, the first separator is coupled with a heat exchanger arranged downstream of the first separator, before being coupled with the second separator, as shown in FIGS. 1 and 3. The heat exchanger can be used for increasing or decreasing the temperature of the first polymer-rich mixture so as to adjust the temperature of it.

The first separator operates at a pressure lower than the pressure of the reaction mixture so as to allow the liquid reaction mixture to be separated into the first polymer-rich mixture and the lean mixture. In at least one embodiment, the pressure of the first separator is from 2 MPa, 2.5 MPa, 3 MPa, or 4 MPa, to 15 MPa, 12 MPa, 10 MPa, 8 MPa, or 6 MPa. The first polymer-rich mixture from the first separator can be passed through the heat exchanger to increase or decrease the temperature of the first polymer-rich mixture. In at least one embodiment, the lean mixture from the first separator is passed in liquid form to a hydrogen removal apparatus for removing hydrogen added to or generated during polymerization. The hydrogen removal apparatus may include a unit for contacting a stripping vapor with the lean mixture in a countercurrent flow arrangement to concentrate the hydrogen in the vapor phase for removal from the lean mixture recycle.

Downstream of the temperature adjustment unit, the first polymer-rich mixture enters a second separator operating at a pressure such that solvent and residual monomers can be vaporized to form a vapor phase and a second polymer-rich mixture in which the polymer is more concentrated than in the first polymer-rich mixture. In at least one embodiment, the second separator operates at a pressure sufficient to allow feeding of the vapor phase to the fractionating and purification system without requiring a separate compressor. In at least one embodiment, said pressure is generally greater than 0.05 MPa, 0.1 MPa, or 0.2 MPa. The pressure in the second separator can be raised to a high level between 0.5 MPa and 2 MPa to adjust the solution viscosity and to facilitate feeding of the second polymer-rich mixture for devolatilization downstream of the second separator. The vapor phase separated from the first polymer-rich mixture can be optionally conveyed to a fractionating tower as a vapor arranged downstream of the flash tank for purification.

Figure 2:
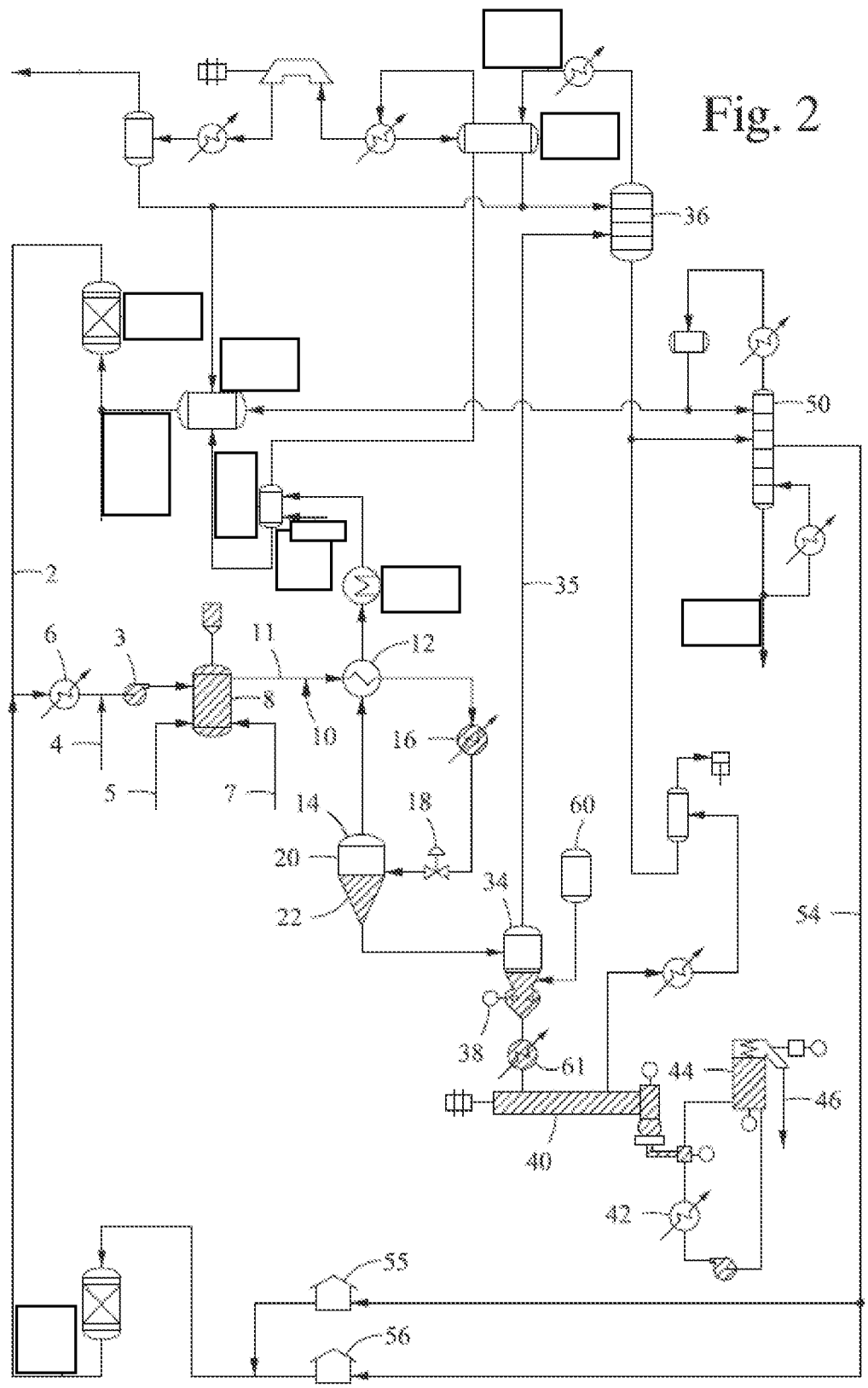
FIG. 2 shows a schematic layout of plant and process flow in another embodiment of the present disclosure in which a temperature adjustment unit is arranged downstream of the second separator and upstream of the devolatilizer.

In at least one embodiment, before the second polymer-rich mixture is passed into the devolatilizer, the second polymer-rich mixture can be passed through an additional temperature adjustment unit, for example, a heat exchanger as shown in FIGS. 2 and 3. The second polymer-rich mixture can be heated or cooled through the heat exchanger upon desired effects on the polymer production.

The second polymer-rich mixture may include at least 50 wt % of polymer, such as at least 60 wt % of polymer, such as at least 70 wt % of polymer, based on the weight of the second polymer-rich mixture. The vapor phase can be separated as an overhead stream from the second separator and the second polymer-rich mixture can be collected in the bottom of the second separator from where it passes through an outlet into a conduit and eventually flows to the devolatilizer.

In at least one embodiment, the plant can include a pump, for example a gear pump arranged upstream or downstream of the heat exchanger for withdrawing the heated or cooled second polymer-rich mixture from the second separator and pumping it to the inlet of the devolatilizer.

In at least one embodiment, the level of volatiles (such as residual solvent, monomer, and/or VOC) present in the second polymer-rich mixture can be less than 60 wt %, such as less than 30 wt %, such as less than 25 wt %, such as less than 20 wt %, such as less than 10 wt %, such as from 1 wt % to 60 wt %, such as from 1 wt % to 30 wt %, such as from 5 wt % to 20 wt %. In at least one embodiment, the level of volatiles in the polymer product downstream of the devolatilizer is not greater than 0.5 wt %, such as not greater than 0.1 wt %, such as not greater than 0.08 wt %, such as not greater than 0.06 wt %, such as not greater than 0.05 wt %, such as not greater than 0.03 wt %, such as not greater than about 500 ppm.

In at least one embodiment, the pressure in the devolatilizer is not greater than 55 mmHg, such as not greater than 30 mmHg, such as not greater than 20 mmHg, such as not greater than 15 mmHg. Suitable devolatilizer temperature can be from 150° C. to 300° C.

In at least one embodiment, the solvent is a non-polar solvent which does not coordinate or interfere with the catalyst in a meaningful way so as to inhibit the catalytic action of the catalyst system. In at least one embodiment, the process uses a low boiling alkane based solvent, or mixtures thereof, which may be linear or branched, such as those having from 4 to 10 carbon atoms, such as from 5 to 7 carbon atoms, optionally in admixture with other alkanes of a higher or lower molecular weight. Suitable solvent can be hexane or isohexane ($iC_6$).

In at least one embodiment of the present disclosure, the polymer may be derived of monomers including mono-olefins such as ethylene or propylene or other higher alpha-olefins having from 4 to 10 carbon atoms. This combination provides a mixture which can be easily separated inside the liquid phase separator.

In at least one embodiment of the present disclosure, working pressures in the reactor(s) can be 8 MPa or greater, such as 9 MPa or greater, such as 10 MPa or greater, such as 12 MPa or greater, such as 14 MPa or greater. The upper pressure limit may not be critically constrained, but can be 20 MPa or less, such as 18 MPa or less, such as 15 MPa or less, such as 14 MPa or less, such as 12 MPa or less. In at least one embodiment, the pressure is sufficient to keep the reaction mixture in a single phase up to the point of the pressure reducing means and to provide the necessary working pressure to convey the fluids through the plant.

The feed temperature into a reactor may vary depending on the available exotherm and extent of monomer conversion desired to reach the polymerization temperature. In at least one embodiment, the temperature is not higher than 60° C., such as not higher than 20° C., such as not higher than 0° C., such as not higher than −20° C., such as less than −20° C., for example, in the range of from −20° C. to −40° C. The polymerization temperature may vary from the desired molecular weight of the polymers allowing for the influence of any chain transfer agent, for example hydrogen added. In a series reactor process, the temperature in the successive reactors can be raised progressively in increments depending on the nature of the polymerization taking place in such reactors. In at least one embodiment, the polymerization temperature for polymers including predominantly (e.g., 50 wt % or more) ethylene derived units is at least 100° C., such as at least 150° C., such as 200° C. or more, varying from desired polymers. Suitable temperature does not exceed the polymerization decomposition temperature or the temperature at which the catalyst can sustain the polymerization reaction.

In at least one embodiment, the exotherm may lead to a temperature differential between the inlet temperature of the polymerization reactor and the outlet temperature of from 50° C. to 220° C. or up to 250° C. In at least one embodiment, by feeding at −40° C. and allowing the exotherm to raise the temperature to 210° C., a highly efficient process may result for producing lower molecular weight polymers. For higher molecular weight polymers, the temperature rise may need to be constrained via warmer feed and/or lower reactor temperatures to avoid excessive viscosity in the reactor solution that would degrade reactor mixing performance, thereby leading to non-uniform polymers.

Monomer concentration may depend on the types of target polymer and molecular weight, the associated conversions of monomer to polymer and the operating temperature. In at least one embodiment, the monomer concentration is from about 10 wt % to about 80 wt %, such as from about 15 wt % to about 70 wt %, such as from about 20 wt % to about 60 wt %. The total vapor pressure of all components may be less than 100 wt % of the reactor pressure at the stream temperature to avoid formation of vapor bubbles. Without being bound by theory, higher monomer concentrations improve the liquid phase separation in the liquid phase separator.

The process of the present disclosure described herein can be performed with any suitable catalysts, for example, a Ziegler Natta catalyst, a single sited catalyst (SSC) or metallocene catalyst. In at least one embodiment, a SSC or metallocene catalyst can be used.

For the purposes of the present disclosure specification, the term "metallocene" is herein defined to contain one or more cyclopentadienyl (Cp) moiety in combination with a transition metal of the Periodic Table of Elements. Suitable metallocene may contain a transition metal of Groups 3 to 10 of the Periodic Table; and at least one ancillary ligand that remains bonded to the transition metal during polymerization. In at least one embodiment, the transition metal is used in a cationic state and stabilized by a cocatalyst or activator. In at least one embodiment, the transition metals are metallocenes of Group 4 of the Periodic Table, such as titanium, hafnium or zirconium which are used in polymerization in the mono-valent cationic state and have one or two ancillary ligands as described in more detail hereafter. The important features of such catalysts for coordination polymerization would be the ligand capable of abstraction and that ligand into which the ethylene (olefinic) group can be inserted.

In at least one embodiment, the catalyst is a bulky ligand transition metal catalyst. The "bulky ligand" contains a multiplicity of bonded atoms, such as carbon atoms, forming a group, which may be cyclic with one or more heteroatoms. The bulky ligand may be metallocene-type cyclopentadienyl derivative, which can be mono- or poly-nuclear. In at least one embodiment, one or more bulky ligands may be bonded to the transition metal atom. Without being bound by theory, it is believed that the bulky ligand can remain in position in the course of polymerization, thus providing a homogenous polymerization effect. Other ligands may be bonded or coordinated to the transition metal, such as ligands may be detachable by a cocatalyst or activator, such as a hydrocarbyl or halogen-leaving group (such as Br, Cl, F or I). It can be assumed that detachment of any such ligand leads to the creation of a coordination site at which the olefin monomer can be inserted into the polymer chain. In at least one embodiment, the transition metal atom is a Group 4, 5 or 6 transition metal of the Periodic Table of Elements, such as the transition metal atom is a Group 4 atom.

Suitable metallocene catalysts can be used with a cocatalyst which may be alumoxane, such as methylalumoxane having an average degree of oligomerization of from 4 to 30 as determined by vapor pressure osmometry. In at least one embodiment, alumoxane may be modified to provide solubility in linear alkanes or be used in slurry, but can be generally used from a toluene solution. Such solutions may include unreacted trialkyl aluminum and the alumoxane concentration can be indicated as mole of aluminoxane per liter (molA·L$^{-1}$), which figure includes any trialkyl aluminum which has not reacted to form an oligomer. The alumoxane, when used as cocatalyst, can be used in molar excess, at a mol ratio of 50 or more, such as 100 or more, such as 1000 or less, such as 500 or less, relative to the transition metal.

Suitable SSC may be selected from among a broad range of available SSCs to suit the type of polymer being made and the process window associated therewith in such a way that the polymer can be produced under the process conditions at an activity of at least 40,000 g polymer per gram SSC (or a metallocene), such as at least 60,000 or even in excess of 100,000 g polymer per gram SSC. By enabling the different polymers to be produced in different operating windows with a suitable catalyst selection, the SSC and any ancillary catalyst components can be used in small quantities, with optionally also using small amounts of scavengers. The catalyst poison can be used in equally small amounts and the various cost-effective methods can then be introduced to allow the non-polar solvent to be recycled and subjected to treatment to remove polar contaminants before re-use in the polymerization reactor(s).

In at least one embodiment, a metallocene may be also used with a cocatalyst which can be a non-coordinating anion (the term "non-coordinating anion" as used herein includes weakly coordinated anions, and the coordination may be sufficiently weak in any event as evidenced by the progress of polymerization to permit the insertion of the unsaturated monomer component).

Suitable precursor for the non-coordinating anion may be used with a metallocene supplied in a reduced valency state. The precursor may undergo a redox reaction. The precursor may be an ion pair of which the precursor cation can be neutralized and/or eliminated in some manner. The precursor cation may be an ammonium salt as in EP 0277003 and EP 0277004. The precursor cation may be a triphenylcarbonium derivative.

The non-coordinating anion can be a halogenated, tetraaryl-substituted Group 10-14 non-carbon element-based anion, such as tetra-aryl-substituted Group 10-14 non-carbon element-based anion that have fluorine groups substituted for hydrogen atoms on the aryl groups, or on alkyl substituents on those aryl groups.

In at least one embodiment, the effective Group 10-14 element cocatalyst complexes derived from an ionic salt, include a 4-coordinate Group 10-14 element anionic complex, where the anion can be represented as:

$$[(M)Q_1Q_2 \ldots Q_i]^-,$$

where M is one or more Group 10-14 metalloid or metal, such as boron or aluminum, and each Q is a ligand effective for providing electronic or steric effects rendering $[(M')Q_1Q_2 \ldots Q_n]^-$ suitable as a non-coordinating anion, or a sufficient number of Q are such that $[(M')Q_1Q_2 \ldots Q_n]^-$ as a whole is an effective non-coordinating or weakly coordinating anion. Exemplary Q substituents may include fluorinated aryl groups, such as perfluorinated aryl groups, and include substituted Q groups having substituents additional to the fluorine substitution, such as fluorinated hydrocarbyl groups. Suitable fluorinated aryl groups include phenyl, biphenyl, naphthyl and derivatives thereof.

The non-coordinating anion may be used in approximately equimolar amounts relative to the transition metal component, such as at from about 0.25 to 4, such as from about 0.5 to 3, such as from about 0.8 to 2, from about 1 to 1.75, such as 1.5.

Representative metallocene compounds can have the formula:

$$L^A L^B L^C_i MDE$$

where $L^A$ is a substituted cyclopentadienyl or heterocyclopentadienyl ancillary ligand n-bonded to M; $L^B$ is a member of the class of ancillary ligands defined for $L^A$, or is J, a hetero-atom ancillary ligand σ-bonded to M; the $L^A$ and $L^B$ ligands may be covalently bridged together through a Group 14 element linking group; $L^C_i$ is an optional neutral, non-oxidizing ligand having a dative bond to M (i equals 0 to 3); M is a Group 4 or 5 transition metal; and, D and E are independently mono-anionic labile ligands each having a σ-bond to M, optionally bridged to each other or $L^A$ or $L^B$. The mono-anionic ligands are displaceable by a suitable activator to permit insertion of a polymerizable monomer or macro-monomer for coordination polymerization on the vacant coordination site of the transition metal component.

Representative non-metallocene transition metal compounds usable as SSCs also include tetrabenzyl zirconium, tetra bis(trimethylsiylmethyl) zirconium, oxotris(trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris (trimethylsilylmethyl) tantalum dichloride.

Additional organometallic transition metal compounds suitable as olefin polymerization catalysts in accordance with the aspects described herein will be any of those Group 3-10 that can be converted by ligand abstraction into a catalytically active cation and stabilized in that active electronic state by a non-coordinating or weakly coordinating anion sufficiently labile to be displaced by an olefinically unsaturated monomer such as ethylene.

Suitable metallocenes can be, but are not limited to, biscyclopentadienyl derivatives of a Group 4 transition metal, such as zirconium or hafnium, for example, as disclosed in WO 99/41294. These may advantageously be derivatives containing a fluorenyl ligand and a cyclopentadienyl ligand connected by a single carbon and silicon atom, for example, as disclosed in WO 99/45040 and WO 99/45041. In at least one embodiment, the Cp ring is unsubstituted and/or the bridge contains alkyl substituents, suitably alkylsilyl substituents to assist in the alkane solubility of the metallocene, for example as disclosed in WO 00/24792 and WO 00/24793. Other possible metallocenes include those in WO 01/58912.

EP 0418044 incorporated herein by reference discloses a monocyclopentadienyl compound similar to that of EP 0416815. Similar compounds are described in ExxonMobil Patent No. EP 0420436. WO 97/03992 incorporated herein by reference shows a catalyst in which a single Cp species and a phenol are linked by a C or Si linkage, such as Me$_2$C(Cp)(3-tBu-5-Me-2-phenoxy)TiCl$_2$. WO 2001/05849 incorporated herein by reference discloses Cp-phosphinimine catalysts, such as (Cp)((tBu)$_3$P=N—)TiCl$_2$.

Other suitable metallocenes may be bisfluorenyl derivatives or unbridged indenyl derivatives which may be substituted at one or more positions on the fused ring with moieties which have the effect of increasing the molecular weight and indirectly permits polymerization at higher temperatures such as described in EP 0693506 and EP 0780395, both of which are incorporated herein by reference.

When using the catalysts described above, the total catalyst system will additionally include one or more organometallic compounds as scavenger(s). Such compounds as used in this application are meant to include those compounds effective for removing polar impurities from the reaction environment and for increasing catalyst activity. Impurities can be inadvertently introduced with any of the polymerization reaction components, such as with solvent, monomer and catalyst feed, and adversely affect catalyst activity and stability. It can result in decreasing or even eliminating catalytic activity, such as when ionizing anion precursors activate the catalyst system. The impurities, or catalyst poisons include water, oxygen, polar organic compounds, metal impurities, etc. In at least on embodiment, the poisons are removed before introduction of such into the reaction vessel, for example by chemical treatment or careful separation techniques after or during the synthesis or preparation of the various components, but some minor amounts of organometallic compound will still normally be used in the polymerization process itself.

In at least one embodiment, these compounds will be organometallic compounds such as the Group-13 organometallic compounds of U.S. Pat. Nos. 5,153,157 and 5,241,025, International Publication Nos. WO 91/09882, WO 94/03506, WO 93/14132, and WO 95/07941. Exemplary compounds include triethyl aluminum, triethyl borane, tri-isobutyl aluminum, tri-n-octyl aluminum, methylalumoxane, and isobutyl alumoxane. Alumoxane also may be used in scavenging amounts with other means of activation, e.g., methylalumoxane and tri-isobutyl-aluminoxane with boron-based activators. In at least one embodiment, the amount of such compounds to be used with catalyst compounds is minimized during polymerization reactions to that amount effective to enhance activity (and with that amount necessary for activation of the catalyst compounds if used in a dual role) since excess amounts may act as catalyst poisons.

The present disclosure as explained above permits polymerizations of a wide variety of polymer types and molecular weights. For example, the polymers can be derived from either ethylene or propylene as the dominant (e.g., more than 50 wt %) component. Polymers may contain from 5 mol % to 40 mol % of comonomers to vary crystallinity and flexibility. The comonomers may be alpha-olefins (under which term cyclic olefins such as styrene are included) having from 2 to 20 carbon atoms, such as ethylene (in the case of the polymer consisting predominantly of propylene derived units), propylene, 1-butene, 1-hexene, and 1-octene. Amounts of dienes such as hexadiene, vinyl norbornene, ethylidene norbornene (ENB), norbornadiene, etc., may be included to promote unsaturation and/or the formation of longer branches themselves made from polymerized monomer derived units.

In the case of plastomer, the polymer which may be produced includes the following aspects: in at least one embodiment, the comonomer can be an alpha-olefin having from 3 to 15 carbon atoms, such as 4 to 12 carbon atoms, such as 4 to 10 carbon atoms. Ethylene can be polymerized with at least two comonomers to form a terpolymer. For example, ethylene can be polymerized in a proportion of 70 mol % to 99.99 mol %, such as from 70 mol % to 97 mol %, such as 80 mol % to 95 mol % of ethylene with 0.01 mol % to 30 mol %, such as 3 mol % to 30 mol %, such as from 5 mol % to 20 mol % comonomer. In at least one embodiment, the molecular weight distribution of a polymer can be determined with a Waters Gel Permeation Chromatograph equipped with Ultra-styrogel columns and a refractive index detector. The operating temperature of the instrument can be set at 145° C., the eluting solvent can be trichlorobenzene, and the calibration standards included sixteen polystyrenes of precisely known molecular weight, ranging from a molecular weight of 500 to a molecular weight of 5.2 million, and a polyethylene standard, NBS 1475.10. The molecular weight distribution of the plastomers produced in this embodiment are termed "narrow", that is, an Mw/Mn can be less than or equal to 3, such as less than or equal to 2.5. The MI of the polymers can be from 0.01 dg/min to 200 dg/min, such as 0.1 dg/min to 100 dg/min, such as 0.2 dg/min to 50 dg/min, such as less than 10 dg/min. Contemplated densities of the plastomers are in the range of 0.85 $g/cm^3$ to 0.93 $g/cm^3$, such as from 0.87 $g/cm^3$ to 0.92 $g/cm^3$, such as 0.88 $g/cm^3$ to 0.91 $g/cm^3$.

In at least one embodiment, processes described herein may utilize copolymerization reactions involving the polymerization of one or more of the monomers, for example alpha-olefin monomers of ethylene, propylene, 1-butene, 1-pentene, 1,4-methyl-1-pentene, 1-hexene, 1-octene, 1-decene and cyclic olefins such as styrene. Other monomers may include polar vinyl, dienes, norbornene, acetylene, and aldehyde monomers.

In the case of elastomer, the polymer which may be produced includes an ethylene-alpha-olefin-diene elastomer (EODE) of high Mw and a diene content of greater than 0.3 wt %, such as greater than 2 wt %. These polymers may be largely amorphous and have a low or zero heat of fusion. As used herein, the term "EODE" encompasses elastomeric polymers included of ethylene, alpha-olefin, and one or more non-conjugated diene monomers. The non-conjugated diene monomer may be a straight chain, branched chain or cyclic hydrocarbon diene having from 6 to 15 carbon atoms. Examples of suitable non-conjugated dienes are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,4-cyclohexadiene and 1,5-cyclododecadiene; and multi-ring alicyclic fused and bridged ring dienes such as tetrahydroindene, methyl tetrahydroindene, dicyclopentadiene; bicyclo-1,5-(2,2,1)-hepta-2,5-diene; alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Suitable dienes used to prepare ethylene-propylene-diene elastomers (EPDMs) can be 1,4-hexadiene (HD), 5-ethylidene-2-norbornene (ENB), 5-vinylidene-2-norbornene (VNB), 5-methylene-2-norbornene (MNB), and dicyclopentadiene (DCPD). In at least one embodiment, dienes are 5-ethylidene-2-norbornene (ENB) and 1,4-hexadiene (HD), such as EOD elastomers may contain 20 wt % up to 90 wt % ethylene, such as 30 wt % to 85 wt % ethylene, such as 35 wt % to 80 wt % ethylene, based on the weight of EOD elastomer. The alpha-olefin suitable for use in the preparation of elastomers with ethylene and dienes can be propylene, 1-butene, 1-pentene, 1-hexene, 1-octene and 1-dodecene. In at least one embodiment, the alpha-olefin is incorporated into the EODE polymer at 10 wt % to 80 wt %, such as at 20 wt % to 65 wt %, based on the weight of the EODE polymer. The non-conjugated dienes are generally incorporated into the EODE at 0.5 wt % to 20 wt %, such as at 1 wt % to 15 wt %, such as at 2 wt % to 12 wt %, based on the weight of the EODE polymer. If desired, more than one diene may be incorporated simultaneously, for example HD and ENB, with total diene incorporation within the limits specified above. In ate least one embodiment of the present disclosure, the elastomer can be a low viscosity polymer, such as low viscosity Vistamaxx™ (LVV).

In at least one embodiment, suitable elastomers may also be a copolymer of two monomers. Such copolymers may be elastomers of relatively high Mw, low crystallinity, and low ash. The copolymers may be ethylene-alpha-olefin-copolymers of high Mw. The ethylene-alpha-olefin-copolymers may be copolymers of ethylene and an alpha-olefin, not necessarily propylene, which exhibits the properties of an elastomer. The alpha-olefins suitable for use in the preparation of elastomers with ethylene can be $C_3$ to $C_{10}$ alpha-olefins. Illustrative non-limiting examples of such alpha-olefins are propylene, 1-butene, 1-pentene, 1-hexene, 1-octene and 1-dodecene. In at least one embodiment, more than one alpha-olefin may be incorporated. The ethylene-alpha-olefin-copolymers may contain 20 wt % up to 90 wt % ethylene, such as 30 wt % to 85 wt % ethylene, such as 35 wt % to 80 wt % ethylene.

In at least one embodiment, the elastomers may be propylene-based polymers having predominantly (50 wt % or more) of propylene derived units.

In at least one embodiment, the propylene-based polymers can be composed of propylene and at least one comonomer, and optionally a diene. The comonomer may be ethylene or an alpha-olefin. Comonomers include ethylene and linear or branched $C_4$ to $C_{30}$ alpha-olefins, or combinations thereof. Suitable linear alpha-olefins include ethylene and $C_4$ to $C_8$ alpha-olefins, such as ethylene, 1-butene, 1-hexene, and 1-octene, such as ethylene or 1-butene. Suitable branched alpha-olefins include 4-methyl-1-pentene, 3-methyl-1-pentene, and 3,5,5-trimethyl-1-hexene. In at least one embodiment, propylene copolymer can be a random copolymer, as the term is defined herein below. A diene may also be included in the propylene-based polymer. In at least one embodiment, diene includes non-conjugated dienes which are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,4-cyclohexadiene and 1,5-cyclododecadiene; and multi-ring alicyclic fused and bridged ring dienes such as tetrahydroindene, methyl tetrahydroindene, dicyclopentadiene; bicyclo-1,5-(2,2,1)-hepta-2,5-diene; alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene. The propylene-based polymer may include 1,4-hexadiene (HD), 5-ethylidene-2-norbornene (ENB), 5-vinylidene-2-norbornene (VNB), 5-methylene-2-norbornene (MNB), and dicyclopentadiene (DCPD).

In at least one embodiment, the propylene-based polymer may have a crystallinity of from 2% to 65%. Within this range of crystallinity, alternative limits of crystallinity can be from about 5% to about 50%, such as from about 10% to about 45%, such as from about 15% to about 40%. The crystallinity of the propylene-based polymer is derived from isotactic (or alternatively syndiotactic) polypropylene sequences in the copolymer. In at least one embodiment, the amount of propylene may be from 65 wt % to 95 wt %, such as from about 70 wt % to 92%, such as from about 80 wt % to 89 wt %.

In at least one embodiment, a propylene-based polymer has a single broad melting transition. Sample of the propylene-based polymer may show secondary melting peaks or shoulders adjacent to the principal peak, and this combination is considered together as single melting point, i.e., a single broad melting transition. The highest of these peaks is considered the melting point. In at least one embodiment, a propylene-based polymer has a melting point of from 25° C. to 110° C., such as from 30° C. to 105° C., such as from 35° C. to 90° C.

The propylene-based polymer can be a random crystallizable copolymer having a narrow compositional distribution. The intermolecular composition distribution of the polymer is determined by thermal fractionation in a solvent. Suitable solvent can be a saturated hydrocarbon, such as isohexane or hexane. The thermal fractionation procedure is described below. In at least one embodiment, approximately 75 wt % or greater, such as about 85 wt % of the polymer is isolated as one or two adjacent soluble fractions with the balance of the polymer in immediately preceding or succeeding fractions. Each of these fractions has a composition (wt % ethylene content) with a difference of not greater than 20% (relative), such as not greater than 10% (relative) from the average wt % ethylene content of the propylene-based polymer. For purposes of the present disclosure, the propylene-based polymer can be considered to have a "narrow" compositional distribution if it meets the fractionation test outlined above.

The length and distribution of stereoregular propylene sequences in suitable propylene-based polymers can be consistent with substantially random statistical copolymerization. Without being bound by theory, sequence length and distribution are related to the copolymerization reactivity ratios. As used herein, the term "substantially random" means a copolymer for which the product of the reactivity ratios is about 2 or less. In contrast, in stereoblock structures, the average length of PP sequences is greater than that of substantially random copolymers with a similar composition.

The reactivity ratios and sequence distribution of the polymer may be determined by $^{13}C$ NMR which locates the ethylene residues in relation to the neighboring propylene residues. To produce a crystallizable copolymer with an amount of randomness and narrow composition distribution needed, it may be desirable to use (1) a single-sited catalyst and (2) a well-mixed, continuous flow, stirred tank polymerization reactor which allows only a single polymerization environment for substantially all of the polymer chains of suitable propylene-based polymers.

Suitable propylene-ethylene copolymers are described in U.S. Pat. No. 6,635,715, the contents of which are hereby incorporated by reference.

When the molecular weight of the polymers is too low, liquid phase separation in the manner described herein may be hindered or made inefficient as an excessive amount of polymer might then be carried over in the lean mixture. The precise boundary depends on solvent composition and polymer composition as well as molecular weight. A rapid pressure let-down, generally greater than 2 MPa/second, such as 3 MPa/second or greater, such as 4 MPa/second or greater, such as 5 MPa/second or greater assists in inducing disengagement of the two phases. A rapid pressure decrease starts from a pressure above the binodal boundary or lower critical solution temperature (LCST) and stops at a pressure below the spinodal boundary. Suitable phase separation can be by spinodal decomposition and is called pressure induced phase separation (PIPS). In at least one embodiment, the first separator can provide a sufficient residence time to permit the settlement of the lean and the polymer-rich mixture at the lower end of the separator.

Molecular weight control may be exercised through control of hydrogen levels which may be supplementary to control of molecular weight by control of the polymerization temperature.

The lean mixture may be passed in liquid form to an apparatus for removing hydrogen added to or generated during polymerization, which apparatus may include an unit for contacting a stripping vapor with the lean mixture in a countercurrent flow arrangement to concentrate the hydrogen in the vapor phase for removal from the lean mixture recycle.

In at least on embodiment, a stripping vapor can consist of a volatile monomer such as ethylene. Optionally, an inert gas, such as nitrogen or argon, may be used. The stripping vapor may include a stripping vessel to remove hydrogen from the recovered solvent stream for use as the polymerization feed. In at least on embodiment, a stripping vapor has low hydrogen content, such as below 5 ppm by mol. The stripping vapor may be selected to be more volatile than other monomer or solvent components, be substantially devoid of contaminants that are deleterious to the polymerization catalysts, be recoverable in the plant recovery system, and may be available at high enough supply pressure for introduction into the stripping vessel without the aid of separate additional compression.

Polymerization and Initial Separation of Polymer and Solvent

A feed for polymerization is passed through conduit 2 by a centrifugal pump 3. The feed contains: a) isohexane ($iC_6$) as solvent; b) monomer, generally the predominant monomer is ethylene or propylene; c) comonomer which may be any copolymerizable alpha-olefin; and optionally d) a diene or other polyene or cyclic copolymerizable material. The feed is passed through a chiller or cooler 6 in which the feed is optionally chilled to a low temperature for subsequent adiabatic polymerization in the two continuous stirred tank reactors 8 which are operated in series or parallel (for simplicity, only one reactor is depicted in FIGS. 1 to 3). Activator and metallocene catalyst may be premixed and added at 5 and/or 7 to one or both continuous stirred tank reactors 8. A scavenger, such as a scavenger in the form of an alkyl aluminum, such as tri-isobutyl aluminum or tri-n-octyl aluminum, is added at conduit 4 to minimize the impact of poisons in the feed and in the reactor on the catalyst activity.

To complement the molecular weight control provided by controlling the polymerization temperature, hydrogen may be added to one or both reactors through conduits (not shown).

The polymer-containing reaction mixture which emerges from the continuous stirred tank reactors 8 through a conduit 11 is treated with a catalyst poison, such as water or methanol, added to element 10 to terminate the polymerization reaction. A heat exchanger 12 is arranged as part of a heat integrating arrangement and heated by a lean mixture emerging from an upper layer in a first separator (e.g., high pressure separator) 14, and provides an initial increase in the temperature of the reaction mixture in the conduit 11. A trim heat exchanger 16 operating by using steam, hot oil or other high temperature fluid, further increases the temperature to a level suitable for liquid phase separation. The reaction mixture then passes through a let-down valve 18 where a pressure drop is created which causes the separation of the reaction mixture and settlement into the lean mixture and a first polymer-rich mixture below it.

It is important to note that an energy-consuming pump is not required to provide a pressure increase in the conduit 11 between the continuous stirred tank reactors 8 and the first separator 14 as the polymer-containing reaction mixture is propelled by the pressure from the centrifugal pump 3.

Now with reference to FIG. 1, the subsequent treatment of the first polymer-rich mixture is described. The first polymer-rich mixture 22 from the first separator 14 is passed, via a line, through a temperature adjustment unit, for example in the form of a heat exchanger 59, and then passed, via a line, to a second separator 34, for example in the form of flash tank, which has a lower pressure than the first separator 14. In the meantime, VOC (e.g., $iC_6$) and/or inerts are stored in the additional stream, the volatile component source 60, then introduced (e.g., injected) into the low pressure separator (e.g., LPS), and further mixed with the concentrated polymer solutions. The resulting mixture remains as a liquid phase prior to flashing. Presence of VOC and/or inerts provides an amount of cooling and control of polymer melt temperature. Furthermore, injected component(s) provide(s) fast cooling through the evaporative cooling mechanism and can provide the reduction of product volatiles. In the second separator, evaporated solvent and monomer are separated from the first polymer-rich mixture. Alternatively or in addition, VOC and/or inerts may be introduced into the first separator and/or a line between the first separator and the second separator.

The temperature of the first polymer-rich mixture is increased or decreased by at least 1° C., or at least 3° C., or at least 5° C., or at least 10° C. after passing through the heat exchanger 59. For the purposes of reducing the volatile component(s) in polymers, for example, especially with higher viscosity, the temperature of the first polymer-rich mixture is increased after passing through the heat exchanger 59, and on the other hand for the purpose of improving pelletization rate of polymer, for example especially with lower viscosity in the finishing stage, the temperature of the first polymer-rich mixture is decreased after passing through the heat exchanger 59. Presence of LVV (as well as low amounts of volatile components (e.g., solvent, VOC, and/or inerts) in the LVV) can enhance the pelletization performance due to the low viscosity character of the elastomer. Temperature of the polymer-rich mixture may be increased as high as possible but lower than the degradation temperature of polymers. On the other hand, the temperature of the polymer-rich mixture may be decreased as low as possible but higher than the crystallization temperature of the polymers. In at least one embodiment, the heated or cooled first polymer-rich mixture from the heat exchanger 59 is kept in solution. For instance, low viscosity Vistamaxx™ (LVV) can be produced through feeding the concentrated polymer solution from the liquid phase separator (high pressure separator (HPS)) to the Low Pressure Separator (LPS), followed by feeding the concentrated polymer solution (second polymer-rich mixture) into vacuum devolatilizer 40. The concentrated polymer solutions in the vacuum devolatilizer 40 can be sheared between clearances of hooks and disks (not shown), promoting polymer melt surface renewal, thus facilitating volatile(s) removal under vacuum. Temperature of the mixture containing the polymer can be decreased, enabling the polymer to cool off by solvent evaporation and cooling medium around the vacuum devolatilizer 40 and shaft. The partially devolatilized polymer melt may begin to crystallize when the melt temperature is close to the crystallization temperature.

The evaporated solvent, monomer, VOC, and/or inerts phase is passed through conduit 35 in a vapor phase to the purification tower 36 operating by distillation to separate a light fraction of the highly volatile solvent, unreacted ethylene and propylene, VOC, and/or inerts on the one hand and heavier less volatile component(s) such as hexane and any toluene used to dissolve catalyst or activator and unreacted diene type comonomers on the other hand. Use of toluene may be reduced under appropriate circumstances by a suitable selection of catalyst components and catalyst preparation conditions, such as increases in catalyst solution temperature to increase the solubility of the catalyst components to reach a point where so little toluene is present that no separate process for the removal of the toluene is required.

A gear pump 38 conveys the second polymer-rich mixture through a short conduit to a vacuum devolatilizing extruder or mixer, also called "kneader". Molten stabilizer optionally can be injected into the short conduit. The stream of second polymer-rich mixture then enters the inlet of vacuum devolatilizer 40 where again a vapor phase (if present) is drawn off for purification, condensed and then pumped to a purification tower 50. A heavy fraction of toluene used as catalyst solvent and diene such as ethylene norbornadiene (ENB) comonomer or 1-octene comonomer (that were not already removed in the LPS) are recovered by this purification tower 36. The ENB or octene may be recycled through outlet 54. Alternative heavy comonomers, such as ENB and octene, may thereby be stored in separate storage vessels 55, 56, which facilitates rapid product transitions between different product families (e.g., EP(D)M and EO plastomers), while still enabling eventual recovery of the unreacted comonomers. This capability further enhances the flexibility of this process to produce a wide variety of dissimilar products.

Emerging from the vacuum devolatilizer 40, the second polymer-rich mixture flows into a shaft provided with a screw flight or impeller which drives the polymer along the shaft and into an underwater pelletizer fed with water chilled at 42. The polymer pellets are washed and spun dried at 44 to form pellets suitable for bagging or baling at 46.

The level of the second polymer-rich mixture in the second separator 34 is monitored by a nuclear radiation sensor (not shown) and the drive of gear pump 38 is controlled to keep the level within set limits. The drive of pump is controlled so that the flow rate of stabilizer is directly proportional to the speed of gear pump 38.

In the treatment process of the polymer-rich mixture as embodied in FIG. 2, no heat exchanger is arranged downstream of the first separator 14 and upstream of the second separator 34, but the heat exchanger 61 is located downstream of the second separator 34 and upstream of the vacuum devolatilizer 40. The volatile component source 60 is coupled to the second separator 34. In this example, the first polymer-rich mixture is passed to the second separator 34 which has a lower pressure than that of the first separator 14. The second polymer-rich mixture from the bottom of the second separator 34 is passed to the heat exchanger 61 in which the temperature of the second polymer-rich mixture may be increased or decreased. The heated or cooled second polymer-rich mixture is then conveyed by gear pump 38 through a short conduit to a vacuum devolatilizer 40.

In the treatment of the polymer-rich mixture as embodied in FIG. 3, the heat exchanger 59 is located downstream of the first separator 14 and upstream of the second separator 34 and the heat exchanger 61 is located downstream of the second separator 34 and upstream of the vacuum devolatilizer 40. In this example, the first polymer-rich mixture is passed to the heat exchanger 59 in which the temperature of the second polymer-rich mixture is increased or decreased, and then passed to the second separator 34 which has a lower pressure than that of the first separator 14. The second polymer-rich mixture from the second separator 34 is passed to the heat exchanger 61 in which the temperature of the second polymer-rich mixture is increased or decreased. The temperature of the first and the second polymer-rich mixtures can be increased or decreased. The heated or cooled second polymer-rich mixture is then conveyed by gear pump 38 through a short conduit to a vacuum devolatilizer 40. The volatile component source 60 is coupled to the second separator 34. In this example, the heat exchangers 59 and 61 both can be used for increasing the temperature of the first and the second polymer-rich mixture, or both can be used for decreasing the temperature of the first and the second polymer-rich mixture, or one can be used for increasing the temperature of the first or the second polymer-rich mixture and the other can be used for decreasing the temperature of the second or the first polymer-rich mixture. In at least one embodiment, the heat exchanger 59 is used for increasing the temperature of the first polymer-rich mixture and the temperature 61 is used for decreasing the temperature of the second polymer-rich mixture.

For purposes of improving devolatilization process described in the present disclosure, propylene-based polymers such as LVV polymers can be produced. LVV polymers have shown to improve processing and end-use properties of polyolefin compounds. The partially devolatilized polymer starts crystallizing when the melt temperature is close to the crystallization temperature. This target temperature is the prerequisite for a stable pelletization, which can be achieved under two main following aspects 1) the target temperature remains within a narrow window, such as plus or minus 2° C. because of the low volatiles content of the second polymer-rich mixture entering the extruder; and accordingly 2) the deviation from the target temperatures can be corrected in a timely manner in order to avoid pelletization impairments. These aspects are typically not met with a conventional cooling medium being the only significant process variable used to achieve the target melt temperature. The lengthy response time to achieve the target temperature by using the cooling medium alone is in the order of 1-4 hours. Additionally, since low temperature is needed for crystallization, remaining product volatiles of LVV holding high evolution temperature due to thermodynamic constraints (equilibrium concentrations) would otherwise prevent the production of a grade of high quality polymers. The amount of remaining product volatiles can be determined mainly by melt temperatures in the vacuum devolatilizer 40. These common issues encountered during the process are resolved by injecting volatile components into the second separator (LPS) 34 and/or first separator (HPS) 14 or into a line between the first separator 14 and LPS the second separator 34 that interacts with the concentrated polymer solutions through forming a mixture that stays as a liquid prior to flashing into the process. The injected component reduces the partial pressure of solvent vapor (e.g., $iC_6$) in the second separator 34 and vacuum devolatilizer 40. This process provides a significant increase of devolatilization driving force for removing solvent(s) from the cement in the vacuum devolatilizer 40 and provides low product volatiles. Furthermore, injected volatile component provides a fast cooling via evaporative cooling.

With the low boiling point volatile organic compounds, the polymer-rich mixture can be driven into the vacuum devolatilizer 40, thus promoting the reduction of the viscosity. Because the iC$_6$ is extracted out by VOC before the polymer-rich mixture enters the extruder, control of the polymer-rich mixture heading to the extruder at a targeted temperature can be obtained, especially for the low viscosity polymer.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A plant for forming a polymer comprising:
 a polymerization reactor;
 a first separator downstream of the reactor;
 a second separator downstream of the first separator;
 a volatile component source coupled with at least one of: the first separator at a lower portion of the first separator, the second separator at a lower portion of the second separator, and/or a line between the first separator and the second separator; and
 a devolatilizer downstream of the second separator.

2. The plant of claim 1, wherein the first separator is coupled with the second separator via the line which is coupled with the first separator at a first end and coupled with the second separator and a second end.

3. The plant of claim 1, further comprising a temperature adjustment unit coupled with the first separator at a first end and coupled with the second separator at a second end.

4. The plant of claim 1, wherein the volatile component source is coupled with the second separator at the lower portion of the second separator.

5. The plant of claim 4, wherein the volatile component source is coupled with the second separator at a lower ⅓ portion of the second separator.

6. The plant of claim 5, wherein the volatile component source is coupled with the second separator at a lower ⅕ portion of the second separator.

7. The plant of claim 1, wherein the volatile component source is coupled with the first separator at the lower portion of the first separator.

8. The plant of claim 7, wherein the volatile component source is coupled with the first separator at a lower ⅓ portion of the first separator.

9. The plant of claim 8, wherein the volatile component source is coupled with the first separator at a lower ⅕ portion of the first separator.

10. The plant of claim 1, wherein the volatile component source is coupled to the line between the first separator and the second separator.

11. The plant of claim 1, wherein the volatile component source is coupled to at least two of: the first separator, the second separator, and/or the line between the first separator and the second separator.

12. The plant of claim 1, wherein the volatile component source is coupled to each of: the first separator, the second separator, and the line between the first separator and the second separator.

* * * * *